Nov. 11, 1941.   W. F. SCARBOROUGH ET AL   2,262,624
MAP MOUNTING DEVICE
Filed Dec. 13, 1940   5 Sheets-Sheet 1
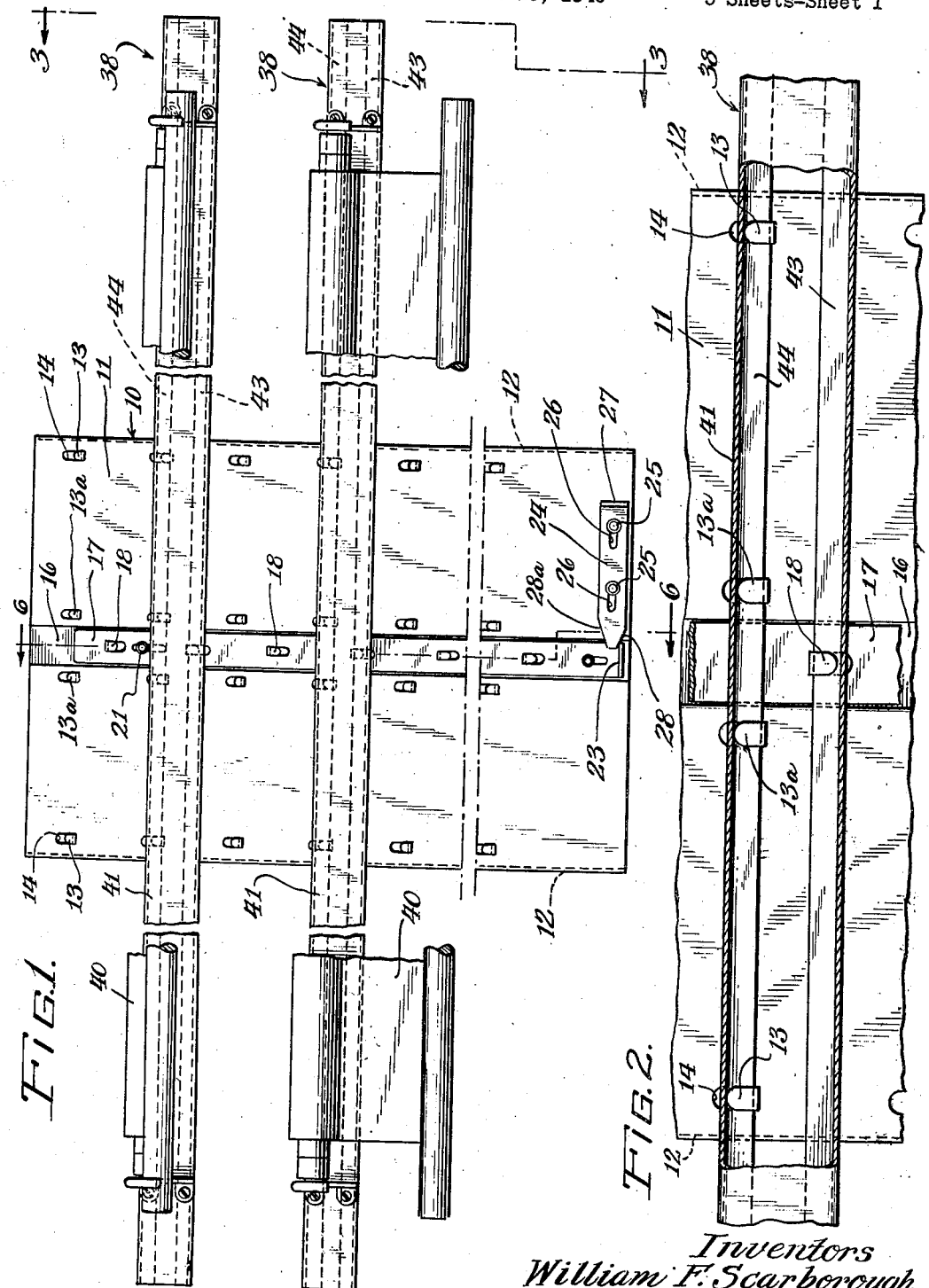
Inventors
William F. Scarborough
and Gildo Tieri
By Wallace and Cannon
Their Attorneys

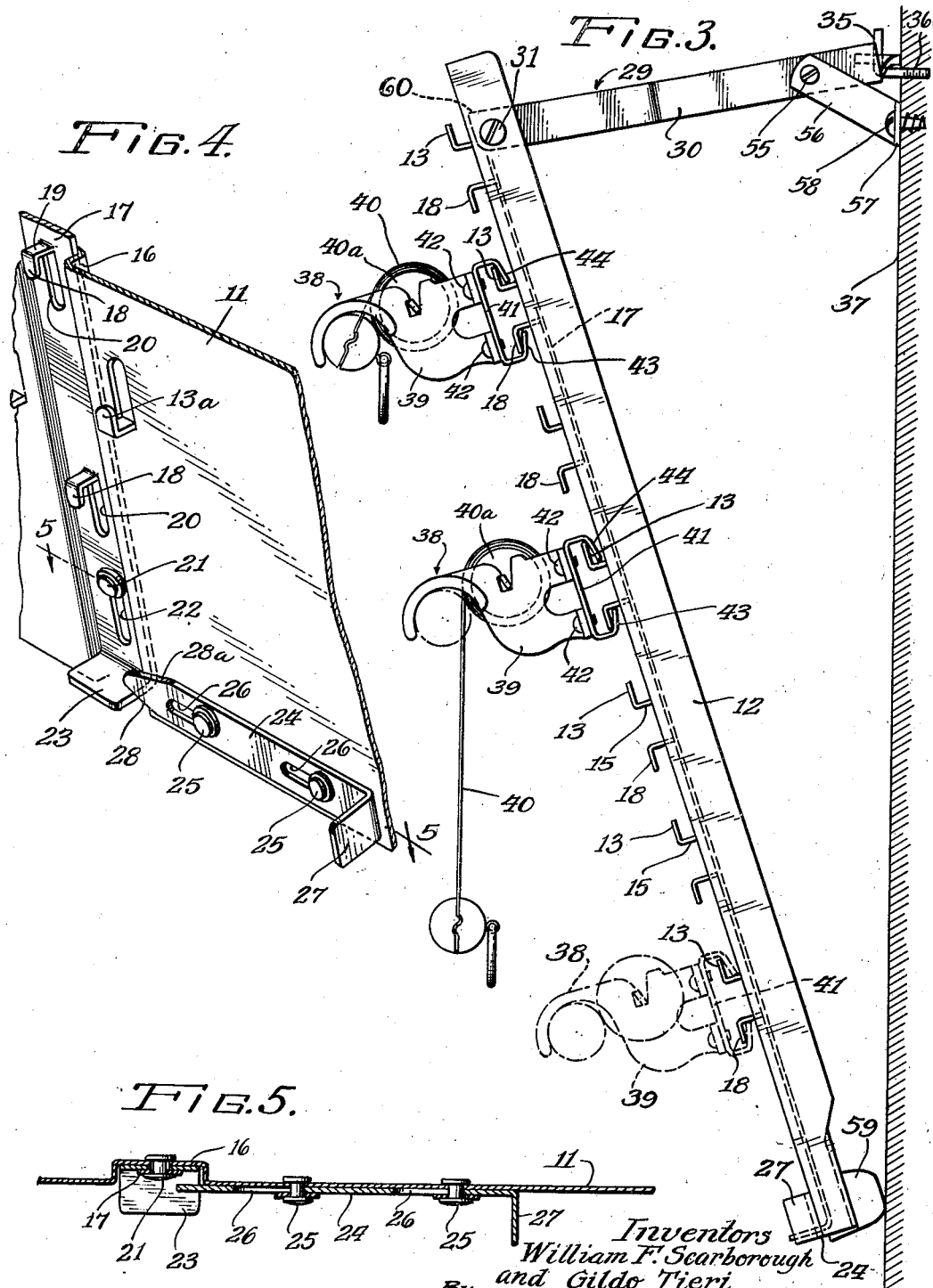

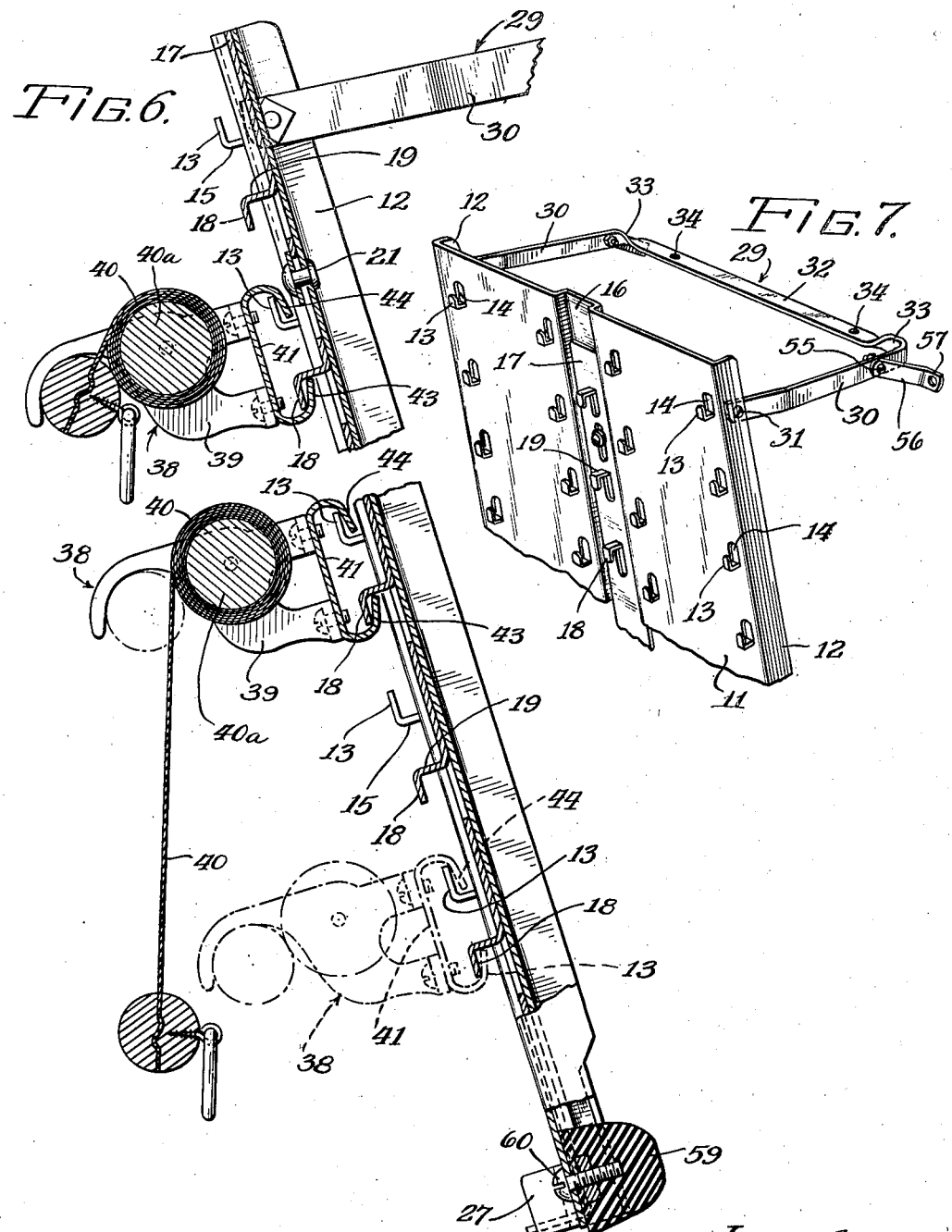

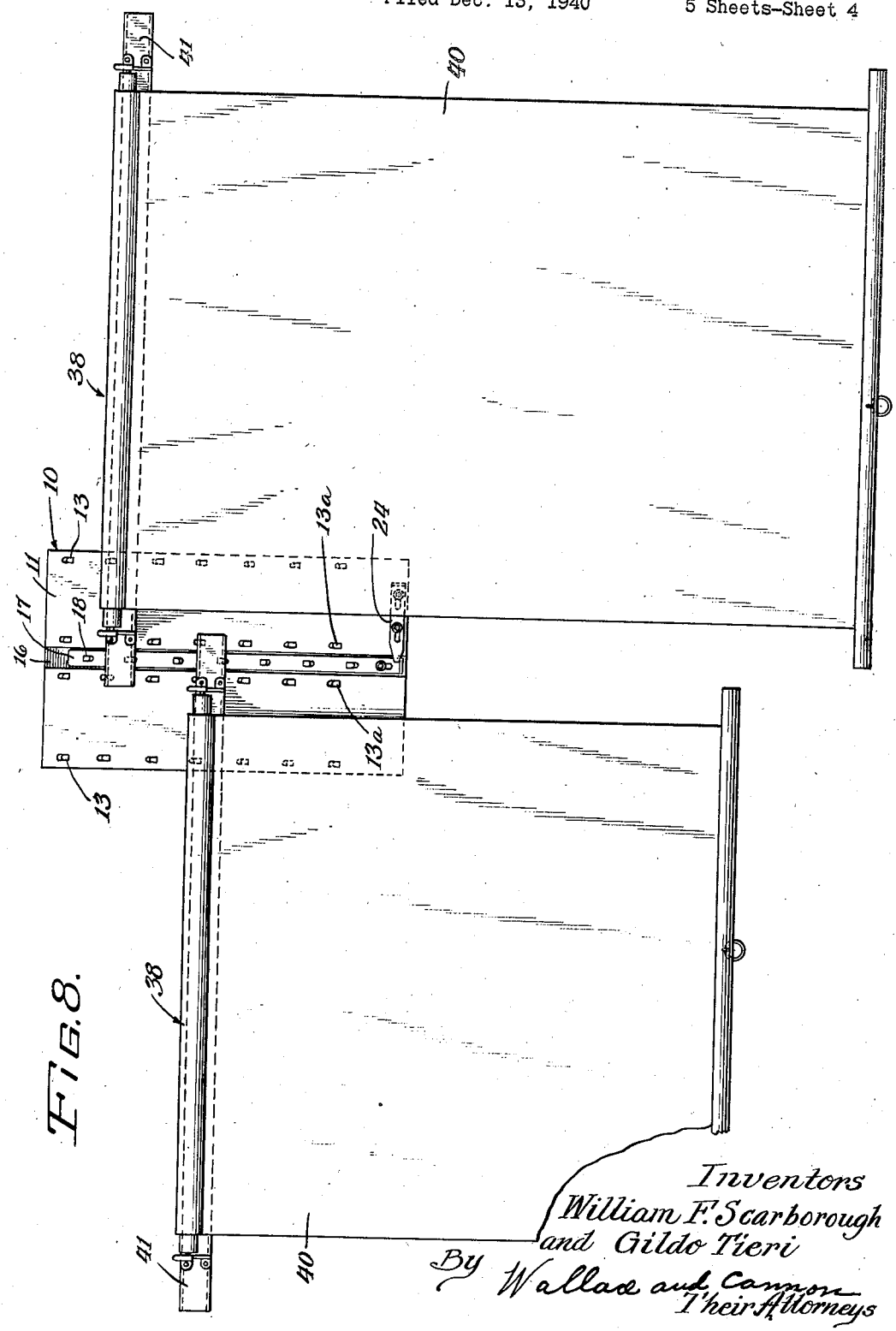

Nov. 11, 1941.  W. F. SCARBOROUGH ET AL  2,262,624
MAP MOUNTING DEVICE
Filed Dec. 13, 1940  5 Sheets-Sheet 5
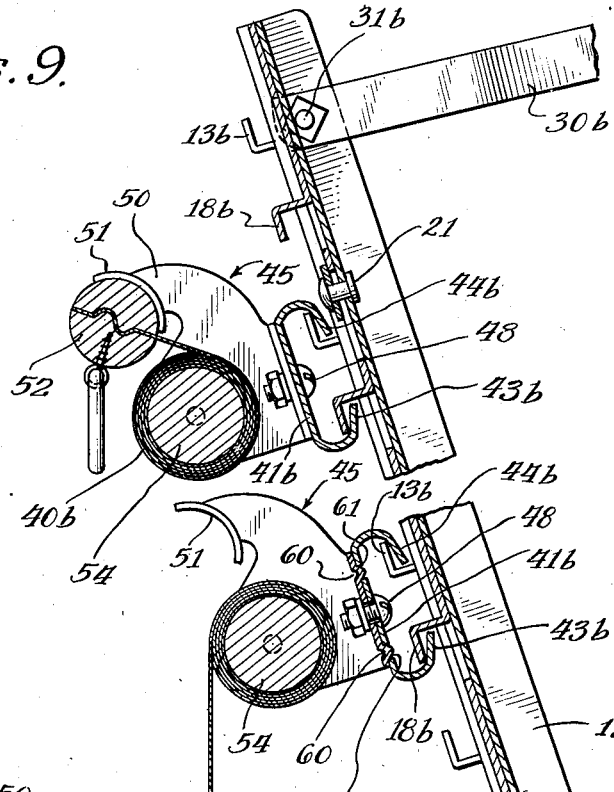
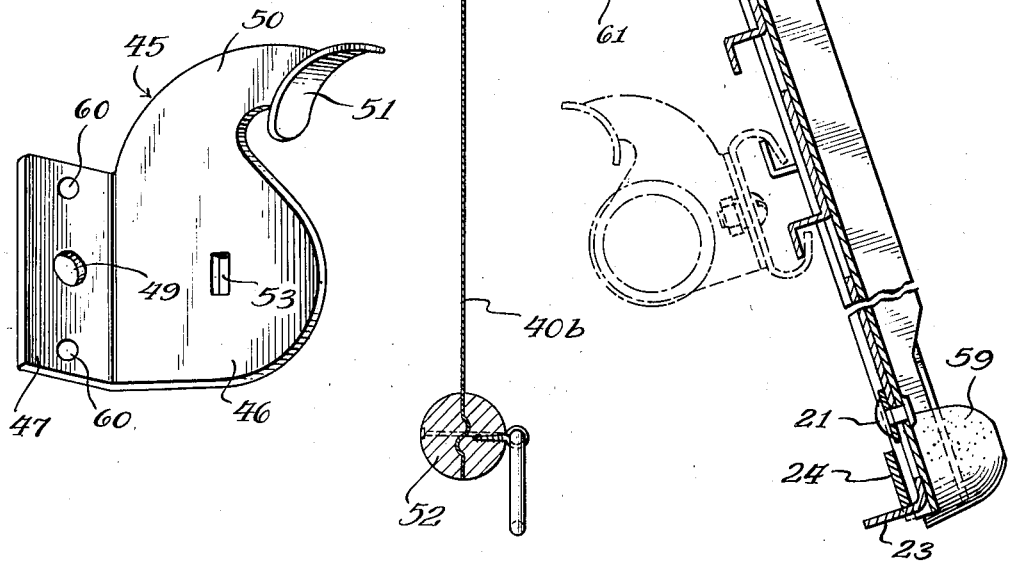
Inventor
William F. Scarborough
and Gildo Tieri
By Wallace and Cannon
Their Attorneys.

Patented Nov. 11, 1941

2,262,624

UNITED STATES PATENT OFFICE 2,262,624

MAP MOUNTING DEVICE

William F. Scarborough and Gildo Tieri, Chicago Heights, Ill., assignors to Weber Costello Company, Chicago Heights, Ill., a corporation of Illinois Application December 13, 1940, Serial No. 369,990

10 Claims. (Cl. 40—83)

This invention relates to a mounting device for display sheets such as maps and the like and especially to the types of roll-up display sheets or maps which are commonly used in educational institutions and other places. More particularly, the present invention relates to a map mounting device which is especially adapted for use in connection with roll-up maps which include a channel-shaped attaching or backing member of the type which is disclosed, for example, in the Hanses Patent No. 1,866,208.

Heretofore in the art it has been the general practice for each of the various manufacturers of roll-up display sheets or maps, having a channel-shaped backing, to provide or employ in conjunction with the same a specially constructed mounting device which could be used, in general, only with the roll-up display sheets or maps of that particular manufacturer, or with the roll-up maps of a limited number of other manufacturers, for the purpose of mounting the same upon a support such as the wall of a school room, or in a box-like roll-up map case or housing, or like place. One result of this practice has been that educational institutions and like places have been compelled to purchase a plurality of separate mounting devices to accommodate the roll-up maps of the various manufacturers of such maps, thus causing schools and like places which use such maps a multiplication of expense.

Accordingly, a primary object of the present invention is to provide a new and improved map mounting device for roll-up maps or like display sheets, having a channel-shaped backing member, and on which the roll-up maps of all of the various manufacturers of such maps may readily be mounted and secured in position of use thereon and from which such roll-up maps may readily be removed.

Another object of the present invention is to provide a new and improved map or display sheet mounting device by means of which the roll-up maps or display sheets of the various manufacturers thereof may be readily mounted upon a supporting surface such, for example, as the wall of a school room, or upon other supporting surface, and either with or without a box-like map case or housing.

A further object of the present invention is to provide a new mounting device for roll-up maps or like display sheets which is relatively simple and inexpensive in construction but at the same time efficient in use.

Heretofore in the art of roll-up map or display sheet mounting devices it has been customary to construct the same in such a manner that when one of a group of roll-up maps mounted thereon is unrolled or pulled down it conceals or obscures substantially the entire area of the other maps behind it which have previously been unrolled or pulled down so that it is possible to display only one map at a time in the use of such roll-up map mounting devices even though a plurality of roll-up maps or roll-up map assemblies may be mounted thereon. Another object of the present invention is to construct the new map or display sheet mounting device in such a manner that in the use thereof not only may a group or plurality of roll-up maps be mounted thereon but so that two roll-up maps, mounted on the new map mounting device may be unrolled or pulled down and displayed simultaneously without removing either of the same from the new map mounting device and in such a manner that neither of the maps thus displayed obscures or conceals any part of the printed area of the other map which is being displayed.

Another object of the present invention is to construct the new map mounting device in such a manner that the roll-up maps may be readily and easily mounted thereon and removed therefrom without the need for or the exercise of any particular skill.

An additional object of the present invention is to provide a new and improved bracket for supporting the new map mounting device, and the roll-up maps supported thereby, against lateral or sidewise swaying when in position of use.

Another object of the invention is to provide a new and improved roller-supporting bracket for a roll-up display sheet or map.

A further object of the invention is to provide a roller-supporting bracket for a roll-up map and which said bracket includes a new and improved stop construction or arm for stopping the lower roller of the roll-up map in its proper position when the map is in its raised or rolled up position and in such a manner as to minimize the wear on the roll-up map sheet and the lower roller which is attached thereto.

Another object of the present invention is to construct the stop arm of the aforesaid bracket in such a manner that it will stop the lower roller of the roll-up map assembly in its proper position and alignment and in such a manner that it will not jump above the bracket during the stopping operation.

Other and further objects of the present invention will be apparent from the following description and claims and are illustrated in the accompanying drawings which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a front elevational view showing a preferred form of the new map or display sheet mounting device and showing, by way of illustration, two roll-up maps mounted thereon;

Fig. 2 is an enlarged fragmentary front elevational view of the new map or display sheet mounting device and showing, in section, the channel-shaped attaching member of a typical roll-up map assembly and illustrating the manner in which such a roll-up map assembly is mounted on the map mounting device which is shown in Fig. 1;

Fig. 3 is a side elevational view, on line 3—3 in Fig. 1, showing the new map or display sheet mounting device in position of use and illustrating a preferred manner of suspending the same upon a vertically extending supporting surface such, for example, as the wall of a school room or the like;

Fig. 4 is a fragmentary front perspective view of the new map or display sheet mounting device which is shown in Figs. 1 to 3, inclusive;

Fig. 5 is a horizontal sectional view on line 5—5 in Fig. 4;

Fig. 6 is an enlarged vertical sectional view on line 6—6 in Fig. 1;

Fig. 7 is a fragmentary front perspective view of the new map mounting device which is shown in Figs. 1 to 6, inclusive, and showing in detail the construction of one form of supporting means which may be employed in conjunction therewith;

Fig. 8 is a front elevational view, similar to Fig. 1, but illustrating the manner in which two roll-up maps, mounted on the new map mounting device, may be unrolled or pulled down and displayed simultaneously without removing either of the same from the new map mounting device and in such a manner that neither of the maps thus displayed obscures or conceals any printed part or area of the other map which is being displayed;

Fig. 9 is a vertical sectional view, similar to Fig. 6, but showing a new form of roller-supporting bracket; and Fig. 10 is a perspective view of the new roller-supporting bracket.

A preferred embodiment of the new map or display sheet mounting device is shown in Figs. 1 to 7, inclusive, of the drawings, wherein it is generally indicated at 10, and comprises a main supporting member in the form of a substantially flat metal plate 11 which may be formed in any suitable manner and from any suitable material as, for example, by stamping the same from flat metal stock. In the preferred embodiment of the invention which is shown in the drawings, the main supporting member or plate 11 is provided at each side or marginal edge thereof with a rearwardly extending flange 12; the purpose of these flanges 12 being explained hereinafter.

Formed upon and integrally with the main supporting member or plate 11, preferably adjacent each side edge thereof (Fig. 1), is a row of map-supporting elements 13, each of which is preferably formed in the shape of a hook or tongue by stamping out the material of the plate 11, thereby forming an opening 14 therein. It will be noted, in this connection, that each of the tongue or hook-shaped map-supporting elements 13 includes a portion which extends upwardly in a direction parallel to the face of the main supporting member or plate 11, but at some distance forwardly of the front face thereof, and that each of these map-supporting elements also includes a portion 15 which projects or extends at right angles to the face of the plate 11.

Similarly formed in the plate 11, adjacent the center thereof as seen in Fig. 1, and on opposite sides of said center, are two rows of hook-shaped map supporting elements 13a which are identical in design and construction to the hook-shaped elements 13.

Formed in the main supporting member or plate 11, preferably approximately midway between and extending parallel to the side edges thereof (Figs. 1, 2, 4 and 7), and between the two rows of hook-shaped elements 13a, is a substantially channel-shaped groove 16 which opens upon the face of the plate 11. Slidably mounted in this groove 16 is a substantially flat latch bar 17 which is guided between the side walls of the groove 16 and formed in this latch or slide bar 17 is a row of latch elements or tongues 18. Each of these tongues or latch elements 18 on the slide or latch bar 17 has a portion which extends substantially parallel to the face of the slide or latch bar 17 and in a downward direction relative to the slide or latch bar 17 and relative to the plate or main supporting member 11. Each of these latch tongues 18 on the slide or latch bar 17 also has a portion 19 which extends at right angles to the face of the slide or latch bar 17 and these latch tongues are preferably formed by stamping out the material of which the slide or latch bar 17 is composed, thereby forming an opening 20 in the slide or latch bar 17.

The slide or latch bar 17 is slidably retained in the groove 17 by means of suitable fastening elements such as the headed rivets 21 which are anchored in or secured to the plate or main supporting member 11, each of these rivets 21 projecting through a slot 22 which is formed in the slide bar 17.

Formed in the slide or latch bar 17, at the lower end thereof, is a forwardly projecting portion 23 which provides a combination finger grip and latching element, the purpose of which will be explained hereinafter, and slidably mounted on the main supporting member of plate 11, at the front thereof and for movement in a direction transverse or at right angles to the long axis and direction of movement of the slide or latch bar 17, is an auxiliary latch bar or member 24. This latch member 24 is slidably retained on the main supporting plate 11 by means of suitable fastening elements such as the headed rivets 25 which are anchored in or secured to the main supporting member or plate 11; each of these rivets 25 projecting through a slot 26 which is formed in the latch bar 24. This auxiliary latch bar 24 has a forwardly angled end portion 27 which provides a finger grip, and the other end portion of this auxiliary latch bar 24 has a lower cam surface or beveled edge 28 formed thereon, and an upper cam surface or beveled edge 28a, and these cam surfaces 28 and 28a are adapted for latching engagement, at different times, with the latch portion 23 of the main latch bar 17, for reasons which will be described hereinafter.

Various types of devices may be provided for suspending the new map mounting device from or upon a supporting surface such, for example, as a wall of a school room, in a box-like map case, or the like, and at an angle thereto, as shown in Fig. 3. However, in order to illustrate one, and a preferred, manner in which this may be accomplished the new map mounting device is shown as being provided with a generally U-shaped and preferably metal member or bale 29 which includes a pair of side arms 30 and each of these side arms 30 is pivotally connected, as at 31, to one of the side flanges 12 of the main supporting member or plate 11. The U-shaped member or bale 29 also includes a rear or bight portion 32 which extends between and interconnects the side arms 30 thereof. As best shown in Fig. 7 the material of which the rear portion 32 of the bale 29 is formed extends in a generally horizontal direction or plane whereas the material of which the side arms 30 is formed extends in a generally vertical plane, these parts being joined by forming a twist 33 in the metal of which the bight portion 32 is composed, at a point adjacent to the intersection or junction of the side arms 30 with the rear portion or cross arm 32 of the bale 29.

Formed in the rear portion or cross arm 32 of the bale 29 is a pair of spaced openings 34 and each of these openings 34 is adapted to receive the upwardly extending portion 35 of a wall hook 36 which may be mounted in a supporting surface 37 such as the wall of a school room, in a box-like map case, or the like.

Pivotally connected to each of the side arms 30 of the bracket 29, as at 55, is a relatively short arm 56 and each of these arms 56 has an angled rear end portion 57 which is adapted to be secured, by means of a suitable fastening element such as the screw 58 (Fig. 3), to a supporting surface such as the wall 37 of a school room or the like.

As stated hereinbefore, the new map mounting device is so designed and constructed that the roll-up maps of the various manufacturers of such maps may be readily mounted thereon and removed therefrom. While such roll-up maps, as are shown in Figs. 1 to 7, inclusive, do not form any part of the present invention, two of the same are indicated at 38 in the drawings and the construction of such a roll-up map or map assembly will now be briefly described so that the use of the same in conjunction with the present invention may better be understood.

Thus it will be noted that each of the roll-up maps 38 includes a pair of end frames 39, a spring-urged roller 40a which is rotatably mounted or journaled at its ends in the end frames 39, a roll-up map or display sheet 40 which is adapted to be wound upon and to be unwound from the roller 40a, and means in the form of a channel-shaped member 41 for attaching the roll-up map assembly 38, as a whole, to the map mounting device 10; each of the end frames 39 of the roll-up map 38 being attached, as at 42, to the channel-shaped attaching member 40.

Each of the channel-shaped attaching members 41 opens to the rear of the map assembly (Figs. 3 and 6) and each of these channel-shaped attaching members 41 has an upwardly extending lower rear flange 43 and a downwardly extending top rear flange 44, as shown in Figs. 1, 2, 3 and 6.

A pair of spaced resilient or rubber bumper elements 59 are preferably attached to the plate elements 11 at the bottom or main supporting member 11 at the bottom and at the rear side thereof, as at 60 (Fig. 6), and when the new map mounting device is in position of use, as in Fig. 4, these resilient or bumper elements 59 are adapted to abut against the supporting surface 37, which may be a wall or blackboard in a school room, so as to prevent the new map mounting device from marring the same.

While they differ otherwise in construction, all of the roll-up maps or roll-up assemblies of the various manufacturers of such maps, of the character with which the new map mounting device is intended for use, have one feature in common and that feature resides in the fact that all of such roll-up maps or map assemblies includes a channel-shaped attaching or backing member, which is either identical to or similar in construction to the channel-shaped attaching member 40, for attaching the roll-up map assembly to the various types of map mounting devices which the various manufacturers of such maps commonly employ for mounting the same in position of use upon the wall of a school room, in a box-like map case, or like places.

When the new map mounting device is not in use the U-shaped bracket 29 is collapsed against the plate 11 and between the side flanges 12 thereof. However, in the use of the new map mounting device the same may be attached to or suspended from a suitable supporting surface such, for example, as the wall of a school room, or from a blackboard, in a box-like map case, or like place, in any suitable manner, and for the purpose of illustrating a typical use or installation of the new map mounting device the same is shown as being suspended from and at an angle relative to a vertical wall 37, this being accomplished by means of the wall hooks 35—36 which project through the openings 34 which are formed in the rear portion or cross arm 32 of the bale 29 (Fig. 3). It will be understood, in this connection, that the purpose of mounting the new map mounting device in the angular position in which it is shown in Fig. 3 is to enable the roll-up maps or display sheets 40 to be pulled out and extended downwardly parallel to each other as shown in Figs. 3 and 6. It will also be noted, in this connection, that when the new map mounting device is so suspended the bumpers 59 which are mounted on the lower end portion of the main supporting member or plate 17 bears against the vertical supporting surface or wall 37 and prevent marring or scratching of the latter.

It will also be noted, in this connection, that when the new map mounting device is mounted in position of use, as in Fig. 3, the inner end portions 60 of the arms 30 of the bracket 29 engage the body of the plate 11 to hold the bracket 30 in extended position (as in Figs. 3 and 7) and arms 56 prevent the bracket 29—30—32 and the plate 17 and the roll-up maps carried thereby from swaying or tilting laterally or sidewise, due to the weight of the maps or otherwise, and hence serve to keep the entire assembly in proper position.

The slide or latch bar 17 is normally held in raised position by projecting the beveled upper edge 28a of the latch bar 24 under the angled lower end portion 23 of the slide bar 17 and the bar 17 is latched in its lowered position by projecting the beveled lower edge 28 of the latch bar 24 over the angled lower end portion 23 of the slide bar 17.

In order to mount one or a plurality of roll-up maps or map assemblies on the new map mounting device the downwardly extending upper rear flange 44 of the channel-shaped attaching member 41 of each roll-up map or map assembly is inserted over and is suspended from a horizontally aligned row of the upwardly extending tongues or supporting elements 13 and 13a on the plate or supporting member 11 in such a manner that each of the roll-up maps or map assemblies is supported in a generally horizontal position upon the face of the plate or main supporting member 11 as shown in Fig. 1.

Accordingly, after the desired number of roll-up maps or roll-up map assemblies has been mounted upon the main supporting member or plate 11, in the manner described above, the latch or slide bar 17 is lowered, by pressing downwardly upon the lower end or finger grip portion 23 thereof, the slide or latch bar 17 being thus lowered into the position in which it is shown in Figs. 1, 2, 3 and 6. As and when the slide or latch bar 17 is thus lowered the downwardly extending latch tongues 18 on the slide or latch bar 17 engage in front of, and enter into latching engagement with, the downwardly extending rear flange 43 of the channel-shaped attaching member 41, as best shown in Figs. 3 and 6. The auxiliary latch bar 24 is then slid into latching position above the angled lower end portion 23 of the slide bar 17 (from right to left as seen from the front of the main supporting member or plate 11) thereby projecting the lower cam surface 28 of the auxiliary latch bar 24 over and into latching engagement with the angled lower end portion 23 of the slide or latch bar 17, as shown in Figs. 1, 3, 4 and 6, thereby latching the slide or latch bar 17 in lowered position and, at the same time, latching the roll-up map assemblies upon the new map mounting device since when the parts are thus latched and the upwardly extending supporting elements 13 on the plate or main supporting member 11 are engaged under the downwardly extending rear flange 44 of the channel-shaped attaching member 41 and the downwardly extending latch elements or tongues 18 on the latch bar 17 are engaged under the upwardly extending rear flange 43 of the channel-shaped attaching member 41 the roll-up maps or map assemblies are latched in place and cannot be removed from the new map mounting until the parts are unlatched in the manner which will now be described.

In order to remove any one or all of the roll-up maps or map assemblies from the new map mounting device it is merely necessary to slide the auxiliary latch bar 24 (from left to right as seen from the front of the plate or main supporting member 11) out of latching engagement with the angled lower end portion 23 of the main slide or latch bar 17, and then to raise the main slide or latch bar 17, which may then be latched in raised position by projecting the beveled upper edge 28a of the latch bar 24 under the angled lower end portion 23 of the slide bar 17. When the main slide or latch bar 17 is thus raised the downwardly extending latch tongues 18 thereon are moved upwardly out of latching engagement with the upwardly extending rear flanges 43 of the channel-shaped attaching members 41, whereupon one or all of the roll-up maps or roll-up map assemblies may be removed from the new map mounting device by lifting the downwardly extending rear flange 44 of each of the channel-shaped attaching members 41 off from the two horizontally aligned and upwardly extending tongues or supporting elements 13 on which it is mounted and, at the same time, any maps which it may be desired not to remove from the new map mounting device will remain supported thereon by engagement of the downwardly extending upper flange or rail 44 of the channel-shaped backing member 41 (Fig. 3) with the upwardly extending hooks 13 and 13a.

It will be noted that in the use of the new map mounting device, after each of roll-up maps or roll-up map assemblies has been mounted thereon, in the manner described hereinbefore, and before the main slide or latch bar 17 is pulled down into latching position, each of the roll-up map assemblies 38 may be adjusted transversely or horizontally of the main plate or supporting member 11 by sliding the channel-shaped attaching member 41 thereof on the row of four (or more if desired) horizontally aligned supporting elements or hooks 13 and 13a on which it is mounted. Hence, as shown in Fig. 8, the entire printed areas of the two roll-up maps may be displayed upon the new map mounting device at one time by projecting one map assembly (or group thereof) as far to one side of the main supporting member or plate 11 as it is possible to project or extend the same, while still having each of such map assemblies supported upon at least three of the supporting tongues or hooks 13 and 13a and in position to be latchingly engaged with one of the downwardly extending latch tongues 18 on the slide bar 17 when the latter is pulled down into latching position, and, similarly, projecting the other map or map assembly as far to the other side of the plate or main supporting member 17 as it is possible to project the same while still supporting the channel-shaped attaching portion 41 thereof upon at least three of its supporting elements or hooks 13 and 13a and in position to be latchingly engaged by one of the latch tongues 18 on the latch bar 17 when the latter is slid down into latching position. In this manner, as shown in Fig. 8, it is possible to display the entire area of both maps 40 simultaneously since neither map thus displayed obscures or conceals any part or area of the other map which is being displayed, while it is also possible to slide the maps, thus extended sidewise as in Fig. 8, back into their normal or racked position, as in Fig. 1.

A modified form of roller-supporting bracket is illustrated in Figs. 9 and 10 wherein all parts which are identical in construction to the parts which are shown in Figs. 1 to 8, inclusive, are given the same reference numerals followed by the letter "b", and only such parts in Figs. 9 and 10 will be described herein as are different from corresponding parts shown in Figs. 1 to 8, inclusive.

A preferred embodiment of the new roller-supporting or end bracket is illustrated in Fig. 10 wherein the same is generally indicated at 45, said bracket being preferably formed as a single unitary piece of metal as, for example, by die stamping or otherwise. The bracket 45 includes a body 46 and this body 46 has a flange 47 which is attached to a channel-shaped attaching or backing member 41*b*, which is identical to the backing member 41 (Figs. 1 to 8, inclusive) as by a screw member 48 which is inserted through an opening 49 which is formed in the flange 47 (Fig. 10); the flange 47 likewise being provided with a pair of spaced bosses 60 which fit into corresponding recesses or openings 61 in the channel-shaped backing member 41*b* so as to effect a firm connection between the brackets 46 and the backing member 41*b*.

The bracket 45 has an arm 50 and this arm 50 has an arcuate-shaped stop portion 51 (Figs. 9 and 10).

In the use of the new end bracket which is illustrated in Figs. 9 and 10 one of the same may be arranged at each end of the map roller 54 and associated roll-up map 40*b*, and the trunnions of the map roller 54 may be arranged in suitable openings, indicated at 53, in the brackets 45, and the brackets 45 and attached map roller 54 and roll-up map 40*b* may then be mounted in position of use upon the new map mounting device, in the manner which is shown in Fig. 9 and which has already been described hereinbefore in connection with the map mounting device which is shown in Figs. 1 to 8, inclusive.

It will be noted in connection with the new bracket 45 which is illustrated in Figs. 9 and 10 that the "stop" portion or arm 50—51 thereon is disposed above the map 40*b* when the latter is in its rolled up position, as in Fig. 9, rather than being disposed at the side or bottom of the bracket, as in the prior art. This has the advantage that when the map is rolled up the bottom so-called roller or rod 52 thereof is disposed out of the way and when other maps which are mounted upon the new mounting device, together with the map 40*b*, are pulled down the back of the top map will not rub against the mounting of the map underneath, thereby eliminating damage which would otherwise result to the maps in the form of wrinkling, creasing or wearing at points of contact.

It will likewise be noted that the "stop" 50—51 is mounted high up on the bracket 45 and projects forwardly of the roller 54 so that it effectively serves to stop the bottom roller or rod 52 in its proper place when the map is rolled up and particularly when the map is rolled up rapidly, thereby preventing the lower roller or rod 52 from jumping up onto or above the supporting brackets for the roll-up map, which frequently was a source of trouble and annoyance in the use of prior art brackets since in the use of the latter the bottom roller or rod would frequently jump up above or onto the bracket, especially when the map was rolled up rapidly, thus making it difficult and inconvenient to get it back in its proper place.

It will likewise be noted that the point of contact between the stop arm 50—51 and the bottom roller or rod 52 of the map (Figs. 9 and 10) is an arcuate-shaped metal bearing surface having no sharp points or ends as in the prior art brackets, thereby reducing the amount of wear on the bottom roller or rod 52 of the map 40*b*, and holding said rod or roller 52 firmly in place when the roll-up map 40*b* is in its raised position.

While we have illustrated and described preferred forms of construction for carrying our invention into effect, these are capable of variation and modification, without departing from the spirit of the invention. We, therefore, do not wish to be limited to the precise details of construction set forth, but desire to avail ourselves of such variations and modifications as come within the scope of the appended claims.

We claim:

1. In a map or display sheet mounting device which is adapted to support a roll-up map or display sheet assembly of the type which includes a roller, a supporting frame for said roller, a roll-up map or display sheet adapted to be wound upon and to be unwound from said roller, and a channel-shaped member having a portion attached to said supporting frame and including a downwardly extending upper flange and an upwardly extending lower flange disposed rearwardly of said portion, the combination of a supporting member having a row of supporting elements thereon, the said roll-up map assembly being adapted to be supported from the said supporting member by engaging the said downwardly extending upper flange of the said channel-shaped member with the said supporting elements in the said row of the same, and a latch member movably mounted upon the said supporting member for movement in a direction transverse to the axis of the said row of supporting elements and having a latch element thereon adapted for latching engagement with the said upwardly extending lower flange of the said channel-shaped member so as to latch the said roll-up map assembly in position of use upon the said supporting member.

2. The map or display sheet mounting device defined in claim 1 in which each of the said supporting elements on said supporting member has an upwardly extending portion which is spaced from the body of the said supporting member and in which the said latch element on the said latch member has a downwardly extending portion which is spaced from the body of the said latch member.

3. The map or display sheet mounting device defined in claim 1 which includes a plurality of generally horizontally extending rows of the said supporting elements and in which the said latch member has a plurality of said latch elements thereon and arranged at spaced intervals thereon and in which each of said latch elements is adapted for latching engagement with the said upwardly extending lower flange of one of said channel-shaped members.

4. The map or display sheet mounting device defined in claim 1 in which the said latch member is slidably mounted and guided in a generally channel-shaped groove which is formed in the said supporting member.

5. The map or display sheet mounting device defined in claim 1 in which the said supporting member is a substantially flat metal plate having a substantially channel-shaped groove formed therein approximately midway between its side edges and opening upon the face of the said plate, and in which the said latch member is a substantially flat metal bar slidably mounted and guided in the said channel-shaped groove.

6. The map or display sheet mounting device defined in claim 1 in which the said supporting member is a flat metal plate having a channel-shaped groove formed therein approximately midway between its side edges and opening outwardly upon the face of said flat metal plate and in which the said latch member is a flat metal bar slidably mounted and guided in the said channel-shaped groove and in which the said supporting elements are formed integrally with the said flat metal plate as tongues stuck out from the body thereof and in which the said latch element is formed integrally with the said slidable metal bar as a tongue stuck out from the body of the said slidable metal bar.

7. The map or display sheet mounting device defined in claim 1 in which the said supporting member is a flat metal plate having a channel-shaped groove formed therein approximately midway between its side edges and opening outwardly upon the face of said flat metal plate and in which the said latch member is a flat metal bar slidably mounted and guided in the said channel-shaped groove and in which the said supporting elements are formed integrally with the said flat metal plate as upwardly extending tongues stuck out from the body thereof and in which the said latch element is formed integrally with the said slidable metal bar as a downwardly extending tongue stuck out from the body of the said slidable metal bar.

8. The map or display sheet mounting device defined in claim 1 in which the said latch member is slidably mounted upon the said supporting member and has an angled lower end portion providing a finger grip for manually operating the said slidable latch member and which said map mounting device includes an auxiliary latch member which is slidably mounted upon the said supporting member for movement in a direction transverse to the extent and direction of movement of the said first-named slidable latch member and in which the said auxiliary latch member has a portion which is latchingly engageable with the said angled lower end portion of the said first-named slidable latch member so as to hold the said latch element thereon in latching engagement with the said upwardly extending flange of said channel-shaped member.

9. The map or display sheet mounting device defined in claim 1 which includes means for latching the said latch member in position to hold the said latch element thereon in latching engagement with the said upwardly extending flange of the said channel-shaped member.

10. The map or display sheet mounting device defined in claim 1 which includes a plurality of generally horizontally extending rows of the said supporting elements and in which the said latch member has a plurality of said latch elements arranged at spaced intervals thereon and in which each of said latch elements is adapted for latching engagement with the said upwardly extending lower flange of one of said channel-shaped members and in which each of the said roll-up map assemblies mounted upon the said map mounting device may be slid in a generally horizontal direction upon its supporting elements, before being latched in position of use, whereby the entire printed area of one of said roll-up maps may be suspended and displayed from or at one side of the said supporting member while simultaneously therewith the entire printed area of another one of said roll-up maps may be suspended and displayed from the other or opposite side of the said supporting member.

WILLIAM F. SCARBOROUGH.
GILDO TIERI.